(12) United States Patent
Suda et al.

(10) Patent No.: US 8,738,218 B2
(45) Date of Patent: May 27, 2014

(54) PRESSURE SENSOR DIAGNOSTIC METHOD AND COMMON RAIL FUEL INJECTION CONTROL DEVICE

(75) Inventors: Sakae Suda, Saitama (JP); Eiichi Sato, Saitama (JP)

(73) Assignee: Bosch Corporation, Tokyo (JP)

( * ) Notice: Subject to any disclaimer, the term of this patent is extended or adjusted under 35 U.S.C. 154(b) by 57 days.

(21) Appl. No.: 13/501,755

(22) PCT Filed: Oct. 8, 2010

(86) PCT No.: PCT/JP2010/067732
§ 371 (c)(1),
(2), (4) Date: Apr. 13, 2012

(87) PCT Pub. No.: WO2011/046074
PCT Pub. Date: Apr. 21, 2011

(65) Prior Publication Data
US 2012/0203422 A1    Aug. 9, 2012

(30) Foreign Application Priority Data
Oct. 13, 2009    (JP) .................................. 2009-236333

(51) Int. Cl.
*F02D 41/22*    (2006.01)
*F02D 41/20*    (2006.01)

(52) U.S. Cl.
CPC ...... *F02D 41/222* (2013.01); *F02D 2041/2055* (2013.01); *F02D 2041/2058* (2013.01); *F02D 2041/223* (2013.01); *F02D 2200/0604* (2013.01)
USPC ........................................ 701/30.3; 701/30.2

(58) Field of Classification Search
CPC .................. F02D 41/20; F02D 41/222; F02D 2041/2055; F02D 2041/2058; F02D 2041/223; F02D 2200/0602; F02D 2200/0604; F02M 63/024

USPC ........... 701/30.4, 29.7, 30.2, 30.3, 30.5, 31.1, 701/31.2
See application file for complete search history.

(56) References Cited

U.S. PATENT DOCUMENTS 6,012,438 A    1/2000  Joos et al.
6,712,047 B2 *  3/2004  Rueger ......................... 123/479

(Continued)

FOREIGN PATENT DOCUMENTS

| JP | 10-325352 | 12/1998 |
| JP | 2000161114 | 6/2000 |
| JP | 2006-77709 | 3/2006 |

OTHER PUBLICATIONS

PCT/JP2010/067732 International Search Report, mailed Jan. 11, 2011.

*Primary Examiner* — John R Olszewski
*Assistant Examiner* — Todd Melton
(74) *Attorney, Agent, or Firm* — Michael Best & Friedrich LLP

(57) ABSTRACT

A pressure sensor diagnosis method and a common-rail-type fuel injection control device to diagnose the presence or the non-presence of an abnormality of a pressure sensor without having a dedicated circuit. A time between energizing of injectors and the occurrence of a peak counter electromotive current is measured as a valve closing time. A rail pressure with respect to the measured valve closing time is obtained as an estimated rail pressure based on a correlation between a valve closing time and the rail pressure. When an absolute value of the difference between the estimated rail pressure and an actual rail pressure is equal to or less than a predetermined error, it is determined that the pressure sensor has no abnormality. Otherwise, it is determined that the pressure sensor has an abnormality.

4 Claims, 6 Drawing Sheets

(56) References Cited

U.S. PATENT DOCUMENTS

| | | |
|---|---|---|
| 7,305,971 B2 * | 12/2007 | Fujii .............................. 123/479 |
| 8,104,334 B2 * | 1/2012 | Wang et al. ................ 73/114.43 |
| 2002/0092504 A1 | 7/2002 | Kohketsu et al. |
| 2006/0054149 A1 | 3/2006 | Uchiyama |
| 2009/0019926 A1 * | 1/2009 | Sommerer ................. 73/114.43 |
| 2009/0205413 A1 * | 8/2009 | Yamauchi et al. ......... 73/114.41 |

* cited by examiner

PRESSURE SENSOR DIAGNOSTIC METHOD AND COMMON RAIL FUEL INJECTION CONTROL DEVICE

CROSS REFERENCE TO RELATED APPLICATIONS

This application is a national phase application of PCT Application No. PCT/JP2010/067732, filed Oct. 8, 2010 which claims priority to Japanese Patent Application No. 2009-236333, filed Oct. 13, 2009, the entire contents of which are hereby incorporated by reference therein.

BACKGROUND OF THE INVENTION

The present invention relates to a diagnosis of abnormality of an operation of a sensor, and more particularly to the realization of the diagnosis of abnormality with the simple constitution without using dedicated parts or the like.

For example, an electronic control unit for an internal combustion engine of an automobile which is represented by a diesel engine includes various sensors, and detection signals of the sensors are used for an operation control of the internal combustion engine.

As one of these sensors, a pressure sensor for detecting a rail pressure in a common-rail-type fuel injection control device is important in realizing the proper fuel injection, and various proposals have been made for detecting abnormality or a malfunction of the pressure sensor.

As one of diagnoses of a malfunction of the pressure sensor in such a common-rail-type fuel injection control device, for example, there has been proposed the following method or the like where, in performing a diagnosis of a malfunction of the pressure sensor, an instruction of intentionally increasing a rail pressure is given, and also an instruction of decreasing an energizing time of injectors is given and, eventually, when it is determined that there is no change in a fuel injection amount so that there is no change in exhaust gas characteristics, it is estimated that there is no malfunction in the pressure sensor (see patent document 1, for example).

However, in the above-mentioned malfunction diagnosis method, for detecting the malfunction of the pressure sensor, it is necessary to make the unnecessary instruction of increasing a rail pressure irrelevant to the fuel injection which is an original purpose, and this instruction brings about not only the redundancy in a control operation but also an undesired actual increase of the rail pressure. There is a possibility that the increase of the rail pressure will influence a fuel injection operation.

As a measure to surely detect abnormality or a malfunction of the sensor while avoiding such a drawback, for example, there has been proposed a method where two pressure sensors are provided, and a malfunction of a pressure sensor is detected by comparing outputs of two pressure sensors. However, it is necessary to provide two pressure sensors which are expensive. Hence, device cost is increased and the method is not always realistic as a result.

RELATED PRIOR ART DOCUMENT

Patent Document 1: JP-A-10-325352 discloses a related system.

SUMMARY OF THE INVENTION

The present invention has been made in view of the above-mentioned circumstances, and it is an object of the present invention to provide a pressure sensor diagnosis method and a common-rail-type fuel injection control device which can realize the diagnosis of the presence or the non-presence of abnormality of a pressure sensor with a simple architecture and without having a dedicated circuit for diagnosing an operation for detecting abnormality or a malfunction of the pressure sensor or the like.

According to one aspect of the present invention, there is provided a pressure sensor diagnosis method in a common-rail-type fuel injection control device which is configured such that fuel in a fuel tank is pressurized and is supplied under pressure to a common rail by a high-pressure pump, a high-pressure fuel is injected into an internal combustion engine by way of an injector connected to the common rail, and a pressure of the common rail is controllable based on a detection signal of a pressure sensor which detects a pressure of the common rail, wherein
a time from a point of time that energizing of the injector is finished to a point of time that a peak of a counter electromotive current generated in the injector is generated after the finishing of the energizing is measured as a valve closing time, a rail pressure with respect to the measured valve closing time is obtained as an estimated rail pressure based on a correlation acquired in advance between a valve closing time and the rail pressure, the estimated rail pressure and an actual rail pressure acquired by the pressure sensor are compared to each other, and the presence or the non-presence of abnormality of the pressure sensor is determined based on a comparison result.

The invention also provides a computer-readable medium storing a computer program which, when loaded in an electronic device, causes that device to generate or process a signal, in accordance with the above-defined invention, that is transmitted from or received by that device.

According to a second aspect of the present invention, there is provided a common-rail-type fuel injection control device which is configured such that fuel in a fuel tank is pressurized and is supplied under pressure to a common rail by a high-pressure pump, a high-pressure fuel is injected into an internal combustion engine by way of an injector connected to the common rail, and a pressure of the common rail is controllable by an electronic control unit based on a detection signal of a pressure sensor which detects a pressure of the common rail, wherein
the electronic control unit is configured such that a time from a point of time that energizing of the injector is finished to a point of time that a peak of a counter electromotive current generated in the injector is generated after the finishing of the energizing is measured as a valve closing time, a rail pressure with respect to the measured valve closing time is obtained as an estimated rail pressure based on a correlation acquired in advance between a valve closing time and the rail pressure, the estimated rail pressure and an actual rail pressure acquired by the pressure sensor are compared to each other, and the presence or the non-presence of abnormality of the pressure sensor is determined based on a comparison result.

BRIEF DESCRIPTION OF THE DRAWINGS

FIG. 5(A) and FIG. 5(B) are waveform charts showing a waveform of an electric current and a waveform of a control voltage at the time of driving an electromagnetic injector, wherein FIG. 5(A) is the waveform chart showing a waveform of an electric current which flows in the electromagnetic injector at the time of driving the electromagnetic injector and at the time of finishing the driving of the electromagnetic injector, and FIG. 5(B) is the waveform chart showing a waveform of a drive voltage applied to the electromagnetic injector at the time of driving the electromagnetic injector.

DESCRIPTION OF THE PREFERRED EMBODIMENTS

Hereinafter, an embodiment of the present invention is explained in conjunction with FIG. 1 to FIG. 6.

It will be noted that the components and arrangements described below are not intended to limit the present invention and can be variously modified within the scope of the present invention.

Figure 1:
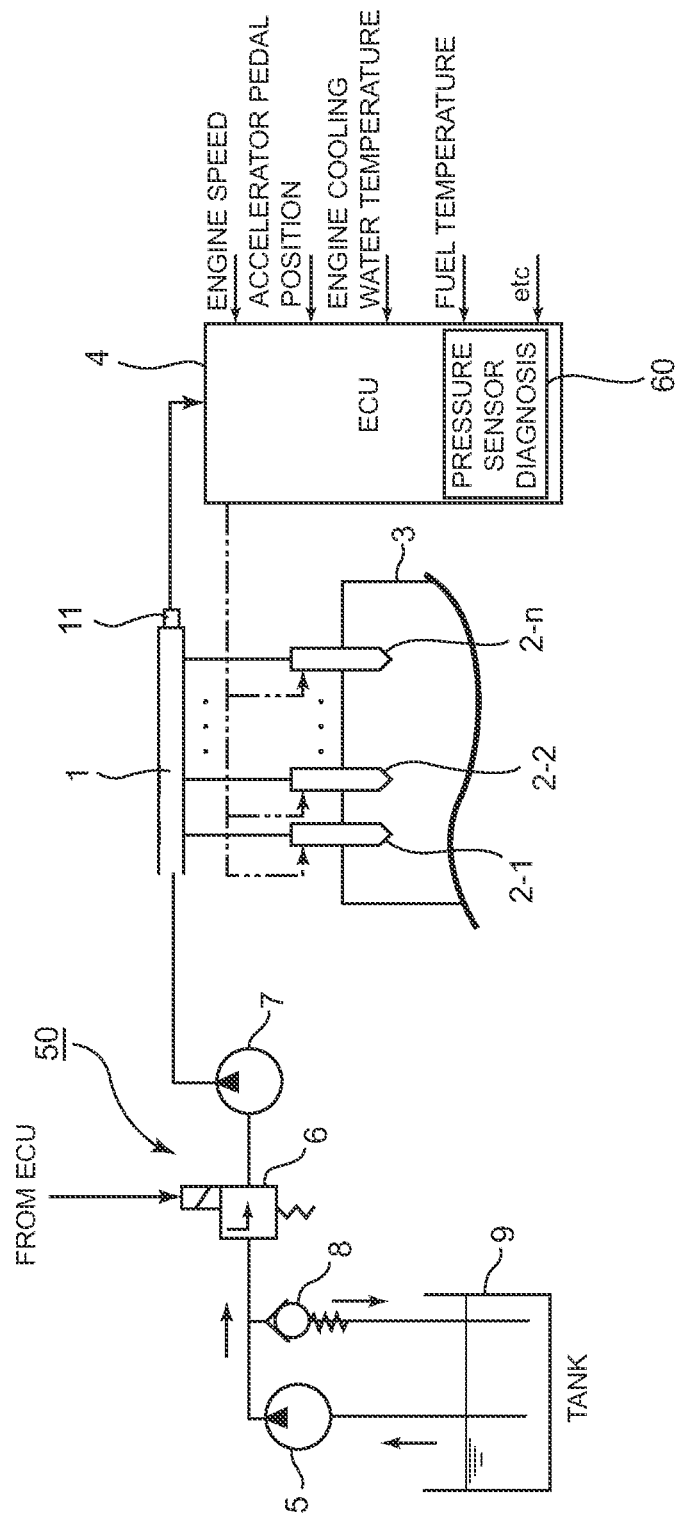
FIG. 1 is a schematic view showing one example of a common-rail-type fuel injection control device to which a pressure sensor diagnosis method according to an embodiment of the present invention is applied.

Firstly, an example of an internal combustion engine injection control device to which a pressure sensor diagnosis method according to an embodiment of the present invention is applied is explained in conjunction with FIG. 1.

The internal combustion engine injection control device shown in FIG. 1 is, to be more specific, constituted of a common-rail-type fuel injection control device particularly.

The common-rail-type fuel injection control device includes, as main constitutional elements thereof, a high pressure pump device 50 which supplies high pressure fuel under pressure, a common rail 1 which accumulates high pressure fuel supplied by the high pressure pump device 50 under pressure, a plurality of injectors 2-1 to 2-n which inject and supply high pressure fuel supplied from the common rail 1 to cylinders of a diesel engine (referred to as "engine" hereinafter) 3, and an electronic control unit (expressed as "ECU" in FIG. 1) 4 which executes fuel injection control processing and pressure sensor diagnosis processing as shown by labeled box 60 in FIG. 1 and FIG. 2 as described later and the like.

The above-mentioned architecture essentially is the same as the basic architecture of this type of fuel injection control device which has been conventionally well-known.

The high pressure pump device 50 has a well-known architecture. That is, the high pressure pump device 50 includes, as main components thereof, a supply pump 5, a metering valve 6, and a high pressure pump 7.

In such a configuration, fuel in a fuel tank 9 is pumped up by the supply pump 5 and is supplied to the high pressure pump 7 through the metering valve 6. As the metering valve 6, an electromagnetic proportional control valve is used. Since an amount of electricity supplied to the metering valve 6 is controlled by the electronic control unit 4, a flow rate of fuel supplied to the high pressure pump 7, that is, a flow amount of fuel discharged from the high pressure pump 7 is adjusted.

A return valve 8 is arranged between an output side of the supply pump 5 and the fuel tank 9 so that surplus fuel on the output side of the supply pump 5 can be returned to the fuel tank 9.

Further, the supply pump 5 may be arranged on an upstream side of the high pressure pump device 50 separately from the high pressure pump device 50 or may be arranged in the inside of the fuel tank 9.

The injectors 2-1 to 2-n are provided to the cylinders of the engine 3 respectively. The injectors 2-1 to 2-n respectively receive the supply of high pressure fuel from the common rail 1, and perform the fuel injection based on an injection control executed by the electronic control unit 4.

The injectors 2-1 to 2-n according to the illustrated embodiment of the present invention are formed of a so-called electromagnetic-valve type injector which has been conventionally used. Particularly, an injector where a core (not shown in the drawing) which is displaced by an electromagnetic force generated with the energizing and a valve element (not shown in the drawing) are formed integrally is preferably used as the injectors 2-1 to 2-n.

A drive control of the injectors 2-1 to 2-n is performed by the electronic control unit 4 so as to enable the injectors 2-1 to 2-n to inject high-pressure fuel into the cylinders of the engine 3. The injectors 2-1 to 2-n are generally configured such that an injection hole (not shown in the drawing) is opened or closed in response to the applying of a drive voltage to the injectors 2-1 to 2-n. In this embodiment of the present invention, the injectors 2-1 to 2-n have the substantially same configuration as the injectors used in general.

The electronic control unit 4 includes, for example, besides a microcomputer 21 having a known or well-known configuration (see FIG. 2) as an essential part thereof, storage elements (not shown in the drawing) such as a RAM and a ROM. Further, the electronic control unit 4 also includes, as main constitutional elements thereof, a circuit for driving the injectors 2-1 to 2-n (not shown in the drawing) by energizing, and a circuit for driving the metering valve 6 and the like (not shown in the drawing) by energizing.

To the electronic control unit 4 having such a constitution, a detection signal of a pressure sensor 11 which detects a pressure in the common rail 1 is inputted. Further, various detection signals such as an engine speed, an accelerator pedal position, an engine cooling water temperature, a fuel temperature and the like are inputted to the electronic control unit 4 for controlling an operation of the engine 3 and for controlling the injection of fuel.

Further, the electronic control unit 4 is configured to read a counter electromotive current which is generated in the injector after the finishing of the energizing of the injector which is required in the pressure sensor diagnosis processing in the embodiment of the present invention described later.

Figure 2:
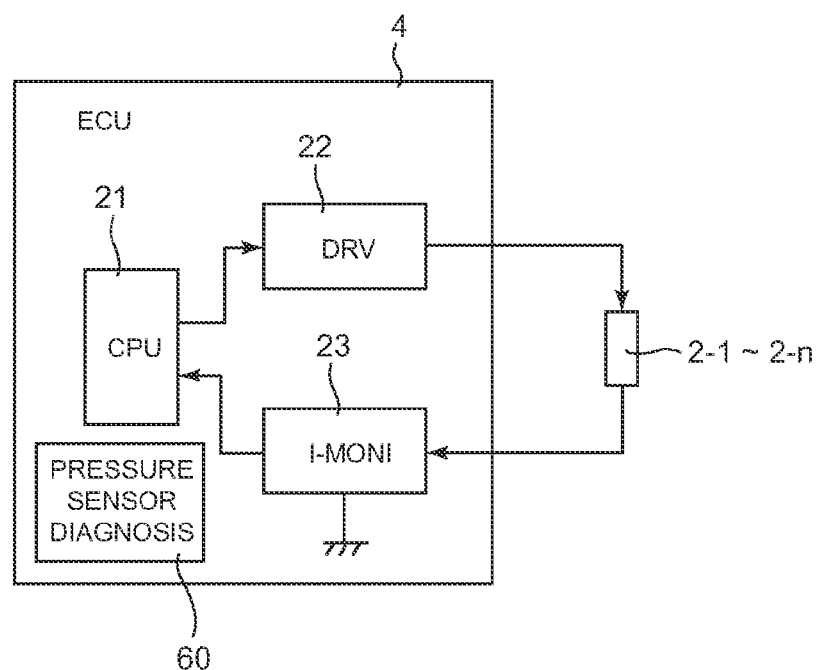
FIG. 2 is a schematic view showing an example of a circuit for driving an injector in an electronic control unit used in the common-rail-type fuel injection control device shown in FIG. 1.

FIG. 2 shows an example of the basic circuit constitution in the electronic control unit 4 for driving the injectors 2-1 to 2-n, and the explanation of the basic circuit constitution is made hereinafter in conjunction with FIG. 2.

The electronic control unit 4 according to the embodiment of the present invention includes a microcomputer (expressed as "CPU" in FIG. 2) 21, and also includes an injector drive circuit (expressed as "DRV" in FIG. 2) 22 which has the substantially same configuration as the prior art for driving the injectors 2-1 to 2-n, and an electric current monitor circuit (expressed as "I-MONI" in FIG. 2) 23.

The injector drive circuit 22 is a so-called drive circuit for energizing the injectors 2-1 to 2-*n* corresponding to an energizing time ET of the injectors 2-1 to 2-*n* calculated by the microcomputer 21.

The electric current monitor circuit 23 is a circuit for detecting an electric current which flows in the injectors 2-1 to 2-*n*, and is configured such that the electric current monitor circuit 23 can detect not only an electric current within the energizing time ET but also a counter electromotive current described in conjunction with FIG. 5 later, and a detected electric current is inputted to the microcomputer 21.

The above-mentioned constitution is not the constitution peculiar to the present invention, and is basically equal to the constitution of a conventional device which uses electromagnetic injectors 2-1 to 2-*n*.

Circuits and the like necessary for other operation controls of the vehicle are arranged in the inside of the electronic control unit 4 in the same manner as the prior art. However, these circuits and the like are not shown in the drawing from a viewpoint of simplifying the drawing thus facilitating the understanding of the present invention.

Figure 3:
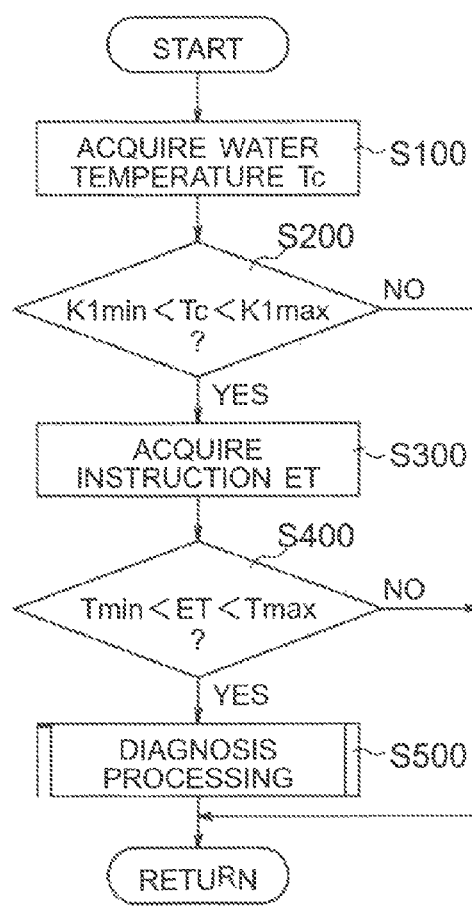
FIG. 3 is a subroutine flowchart showing basic steps of pressure sensor diagnosis processing which is executed by the electronic control unit used in the common-rail-type fuel injection control device shown in FIG. 1.
Figure 4:
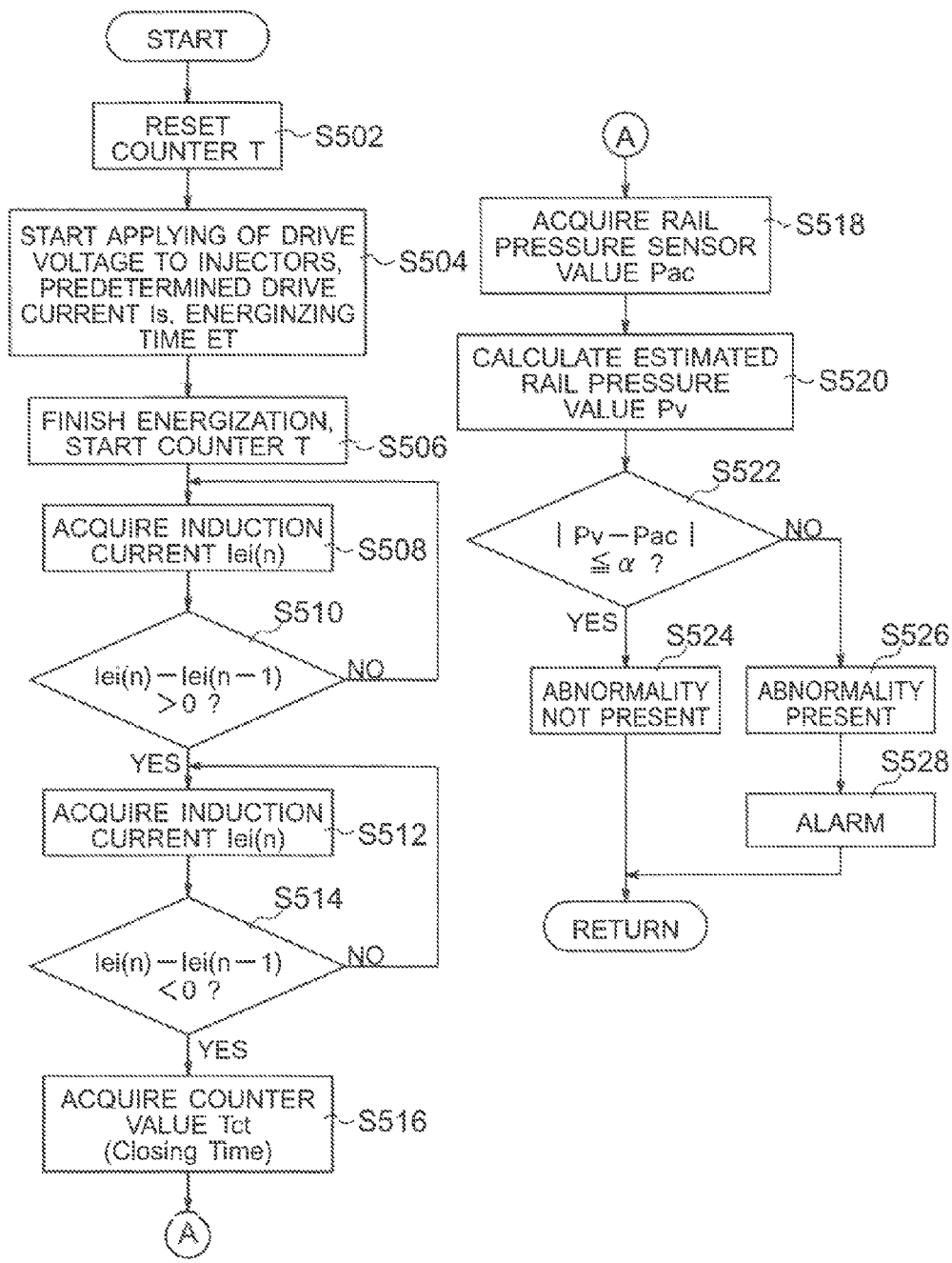
FIG. 4 is a subroutine flowchart showing specific steps of the pressure sensor diagnosis processing.

In FIG. 3 and FIG. 4, steps of the pressure sensor diagnosis processing which is executed by the electronic control unit 4 are shown in subroutine flowcharts. Hereinafter, the pressure sensor diagnosis processing according to the embodiment of the present invention is explained in conjunction with these drawings.

Firstly, the overview of the pressure sensor diagnosis processing according to the embodiment of the present invention is explained.

Figure 5A:
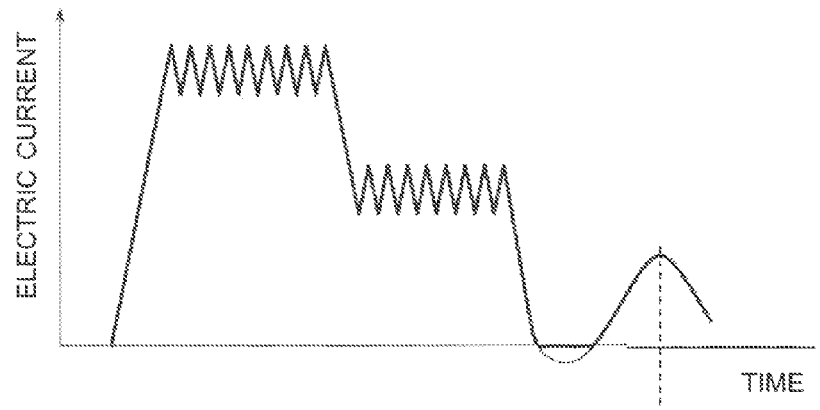
Figure 5B:
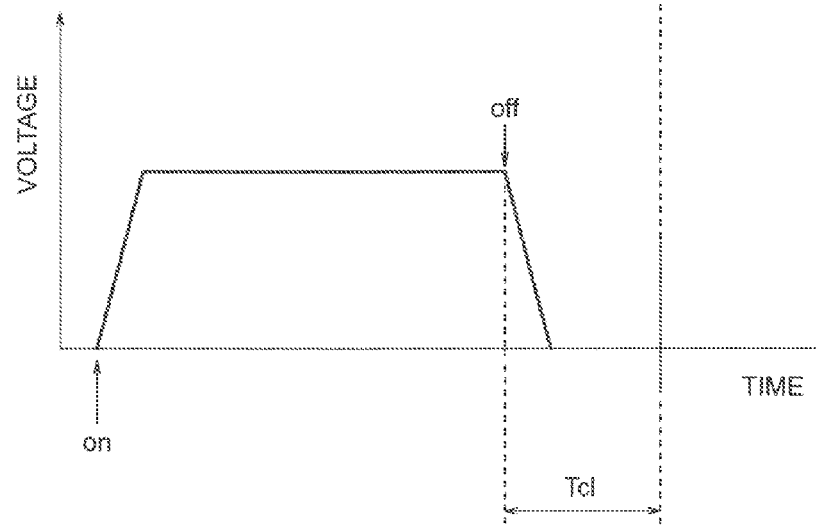

When a drive voltage is applied to the injectors 2-1 to 2-*n* so that the energizing of the injectors 2-1 to 2-*n* is started (see a point of time expressed as "on" in FIG. 5(B)), usually, an energized current assumes a predetermined energized current (peak electric current) during a predetermined time from starting of energization as shown in FIG. 5(A) and, thereafter, is held at a predetermined hold current which is lower than the predetermined energized current. That is, after a peak current which is necessary for displacing the valve element not shown in the drawing to a predetermined position is supplied, the supply of an electric current at a level of the peak electric current is not necessary for holding the valve element (not shown in the drawing) at a position after the displacement and hence, the energized current is lowered to an electric current necessary for holding the valve element at the position.

When the applying of the drive voltage is finished (see a point of time expressed as "off" in FIG. 5(B)), the energized current is steeply lowered from the above-mentioned hold current to 0. However, it has been known that after becoming 0 once, an electric current flows in the injectors 2-1 to 2-*n* again (see FIG. 5(A) and FIG. 5(B)). This electric current is caused by a counter electromotive force generated by inductor components of the injectors 2-1 to 2-*n* and is referred to as a counter electromotive current. Such a counter electromotive current is relatively small compared to an electric current supplied at the time of driving the injectors 2-1 to 2-*n* (see FIG. 5(A)).

The inventors of the present application have focused on this counter electromotive current, and have carried out tests extensively. As a result, the inventors have found that there is a certain correlation between a time from a point of time that the applying of a drive voltage to the injectors 2-1 to 2-*n* is cut away (off) to a point of time that a peak value of a counter electromotive current appears (hereinafter referred to as "valve closing time" for the sake of convenience) and a rail pressure. In FIG. 5, the valve closing time is expressed as "Tcl".

Figure 6:
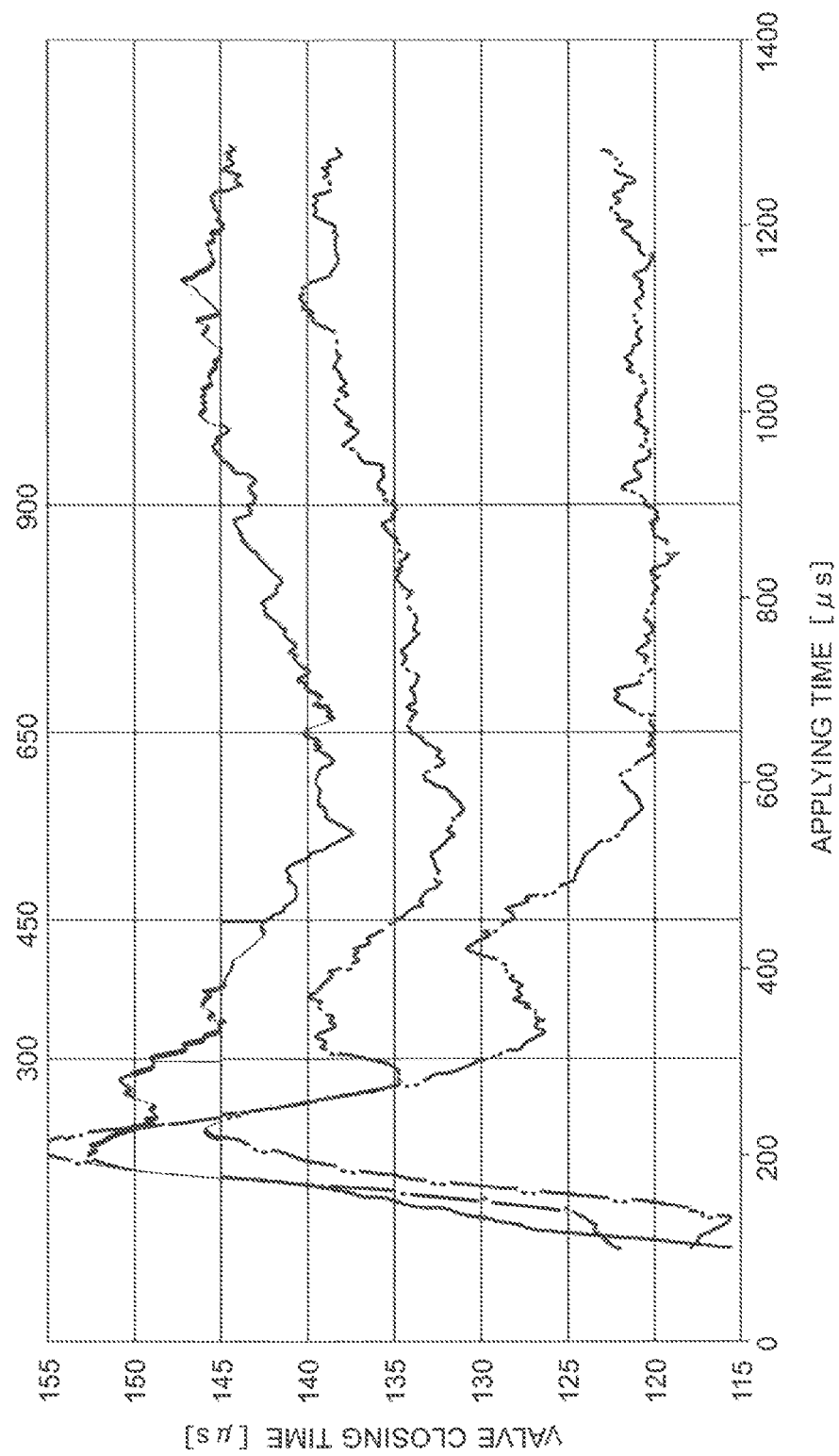
FIG. 6 is a graph showing characteristic lines showing the correlation between a driving time and a valve closing time of the electromagnetic injector used in pressure sensor malfunction diagnosis processing.

To be more specific, the inventors have made the finding that, for example, as exemplified in FIG. 6, when an energizing time of a drive voltage to the injectors 2-1 to 2-*n* falls within a range equal to or exceeding a certain applying time, the valve closing time assumes an approximately fixed value corresponding to a rail pressure.

Here, "energizing time" means a time from a point of time that the applying of a drive voltage to the injectors 2-1 to 2-*n* is started, that is, from a point of time expressed by "on" in FIG. 5(B) to a point of time expressed by "off" in the same drawing, that is, to a point of time that the applying of the drive voltage is finished.

The present invention has been made based on such finding. That is, a valve closing time is measured so as to estimate a rail pressure corresponding to the valve closing time, and it is determined that the pressure sensor 11 has an abnormality (malfunction) when the predetermined difference or more is generated between the estimated rail pressure and an actual pressure detected by the pressure sensor 11.

Next, FIG. 3 shows a subroutine flowchart of the overall steps of pressure sensor diagnosis processing according to this first constitutional example, and the content of the pressure sensor diagnosis processing is explained in conjunction with the drawings.

The pressure sensor diagnosis processing according to the embodiment of the present invention is subjected to subroutine processing as one of various control processing executed for an operation control of a vehicle in the electronic control unit 4.

When the processing executed by the electronic control unit 4 is started, firstly, the acquisition of an engine cooling water temperature Tc is performed. That is, the engine cooling water temperature Tc is read by the electronic control unit 4, and is temporarily stored in a predetermined memory area of the microcomputer 21 (see step S100 in FIG. 3).

Next, the electronic control unit 4 determines whether or not the engine cooling water temperature Tc is within a predetermined temperature range (see step S200 in FIG. 3).

This determination is made so as to determine whether or not the engine 3 is in a sufficient rotational state suitable for executing pressure sensor malfunction diagnosis processing according to embodiments of the present invention.

To be more specific, it is determined whether or not the engine cooling water temperature Tc is higher than a minimum water temperature K1min and is lower than a maximum water temperature K1max. Here, the minimum water temperature K1min and the maximum water temperature K1max differ depending on a specific condition of an individual device such as a size of the engine 3. Hence, it is preferable to select optimum values of the minimum water temperature K1min and the maximum water temperature K1max by a test or a simulation by taking into account the specific condition of the device or the like.

When it is determined that the relationship of K1min<Tc<K1max is established (when the determination is affirmative) in step S200, the processing advances to the processing in step S300 described next. On the other hand, when it is determined that the relationship of K1min<Tc<K1max is not established (when the determination is negative) in step S200, it is determined that a state suitable for executing the pressure sensor malfunction diagnosis processing is not established and a series of processing is finished.

In step S300, the acquisition of an energizing time ET of the injectors 2-1 to 2-*n* is performed.

That is, the electronic control unit 4 according to the embodiment of the present invention adopts the execution of engine control processing as a premise. In the engine control processing, an energizing time ET of a drive voltage to the injectors 2-1 to 2-n is calculated based on an engine speed, an accelerator pedal position and the like inputted to the electronic control unit 4, and the energizing time ET is instructed to the injector drive circuit 23.

Accordingly, in this step S300, it is preferable to make use of the energizing time ET calculated in the engine control processing.

Next, it is determined whether or not the energizing time ET acquired in step S300 falls within a predetermined energizing time range (see step S400 in FIG. 3).

That is, it is determined whether or not the acquired energizing time ET is larger than a predetermined minimum energizing time Tmin and is smaller than a predetermined maximum energizing time Tmax. When it is determined that the relationship of Tmin<ET<Tmax is established (when the determination is affirmative), the pressure sensor malfunction diagnosis is specifically executed (see step S500 in FIG. 3). On the other hand, when it is determined that the relationship of Tmin<ET<Tmax is not established (when the determination is negative), it is determined that a state suitable for executing the pressure sensor malfunction diagnosis processing is not established and a series of processing is finished.

Here, in the same manner as the minimum water temperature K1min and the like described previously, it is preferable to select optimum values of the minimum energizing time Tmin and the maximum energizing time Tmax by a test, a simulation or the like by taking into account the specific condition of the device or the like.

Next, specific processing steps of the pressure sensor malfunction diagnosis are explained in conjunction with FIG. 4.

When the processing by the electronic control unit 4 is started, firstly, a counter T for measuring a valve closing time is reset (see step S502 in FIG. 4).

Next, during an energizing time ET in which a drive current IS is supplied to the injectors 2-1 to 2-n, the applying of a drive voltage to the injectors 2-1 to 2-n is started (see step S504 in FIG. 4).

Here, the drive current IS and the energizing time ET are calculated corresponding to an operational state of the engine 3 in the engine control processing executed by the electronic control unit 4.

Next, the time measurement by the counter T is started simultaneously with the finishing of energization of the injectors 2-1 to 2-n (see step S506 in FIG. 4).

Here, the counter T is a software counter for measuring a valve closing time. Further, the valve closing time is, as referred previously in the explanation of the overview of the pressure sensor malfunction diagnosis processing in the embodiment of the present invention in conjunction with FIG. 5, a time from a point of time that the applying of a drive voltage to the injectors 2-1 to 2-n is finished to a point of time that a peak of a counter electromotive current appears, and is an interval expressed by symbol Tcl in FIG. 5.

Next, a counter electromotive current to the injectors 2-1 to 2-n which is generated after the finishing of the energization, that is, an induction current Iei is read by the microcomputer 21 through the current monitor circuit 23 (see step S508 in FIG. 4).

To express the latest induction current acquired in this step S508 as Iei(n) and the induction current acquired by the processing in previous step S508 as Iei(n-1), in next step S510, it is determined whether or not the difference between the induction current acquired this time and the induction current acquired previously is larger than zero, that is, whether or not the relationship of Iei(n)−Iei(n-1)>0 is established.

When it is determined that the relationship of Iei(n)−Iei(n-1)>0 is established (when the determination is affirmative) in step S510, the processing advances to the processing in step S512. On the other hand, when it is determined that the relationship of Iei(n)−Iei(n-1)>0 is not established (when the determination is negative) in step S510, it is determined that a counter electromotive current is not generated and the processing returns to step S508.

In step S512, it is determined that a counter electromotive current explained previously in conjunction with FIG. 5 is increased, and an induction current is acquired again and is set as the latest induction current Iei(n).

Next, it is determined whether or not the difference between the induction current Iei(n) acquired in this step S512 and an immediately-previous induction current, that is, the induction current Iei(n-1) acquired in step S508 is below zero. That is, it is determined whether or not the relationship of Iei(n)−Iei(n-1)<0 is established (see step S514 in FIG. 4).

When it is determined that the relationship of Iei(n)−Iei(n-1)<0 is established (when the determination is affirmative) in step S514, the processing advances to the processing in step S516 described next. On the other hand, when it is determined that the relationship of Iei(n)−Iei(n-1)<0 is not established (when the determination is negative) in step S514, it is determined that the induction current is still increasing so that the processing returns to the processing in previous step S512.

In step S516, in accordance with the determination that the relationship of Iei(n)−Iei(n-1)<0 is established in previous step S514, it is determined that the induction current passes a peak and enters a descending state so that the time measurement by the counter T described above is stopped and a measured value Tct is acquired.

Next, an actual rail pressure Pac detected by the pressure sensor 11 is read by the electronic control unit 4 so that the electronic control unit 4 acquires the actual rail pressure Pac (see step S518 in FIG. 4).

Then, an estimated value of the rail pressure (estimated rail pressure Pv) is calculated based on the counter value Tct acquired previously (see step S520 in FIG. 4).

That is, according to the embodiment of the present invention, an estimated rail pressure calculation table for acquiring an estimated rail pressure from a valve closing time is stored in the electronic control unit 4 in advance, and an estimated rail pressure with respect to the counter value Tct acquired in step S516 is calculated using this estimated rail pressure calculation table.

The estimated rail pressure calculation table is set based on the correlation characteristic explained in conjunction with FIG. 6 previously between an applying time and a valve closing time using a rail pressure as a parameter. The correlation characteristic between an applying time and a valve closing time is acquired from a test, a simulation or the like.

As explained previously, a valve closing time assumes approximately a fixed value corresponding to a rail pressure when the applying time falls within a range equal to or exceeding a certain applying time. Accordingly, when the valve closing time is determined, the rail pressure (estimated rail pressure) to be set corresponding to the valve closing time can be specified. In the embodiment of the present invention, such a relationship is stored in advance as the estimated rail pressure calculation table in a suitable memory area of the electronic control unit 4, and based on a valve closing time Tct acquired in step S516, the estimated rail pressure Pv corresponding to the valve closing time Tct can be read so that the estimated rail pressure Pv can be specified.

Next, it is determined whether or not an absolute value of the difference between the actual rail pressure Pac and the estimated rail pressure Pv acquired in the above-mentioned manner is equal to or less than a predetermined error α (see step S522 in FIG. 4).

Then, in step S522, when it is determined that the absolute value of the difference between the actual rail pressure Pac and the estimated rail pressure Pv is equal to or less than the predetermined error α (when the determination is affirmative), it is determined that the pressure sensor 11 has no abnormality (see step S524 in FIG. 4), and a series of processing is finished and the processing returns to a main routine.

On the other hand, in step S522, when it is determined that the absolute value of the difference between the actual rail pressure Pac and the estimated rail pressure Pv is not equal to or less than the predetermined error α (when the determination is negative), it is determined that the pressure sensor 11 has abnormality (see step S526 in FIG. 4) and alarm processing is executed (see step S528 in FIG. 4).

As the alarm processing, various alarming processing are named including an alarm display using a lighting element such as a lamp LED, the generation of an alarm sound of a sound generating element such as a buzzer, the display of an alarm message by a display element capable of displaying characters and the like. However, the alarm processing is not limited to specific alarm processing and can be suitably selected. After such alarm processing, a series of processing is finished and the processing returns to a main routine.

According to the present invention, the presence or the non-presence of abnormality of the pressure sensor can be detected based on the correlation between an electric current attributed to a counter electromotive voltage generated in the injector and the rail pressure after the energizing of the injector is finished. Accordingly, the abnormality of the pressure sensor can be easily diagnosed by a change of software without requiring a new part or a dedicated circuit for diagnosis of abnormality of the pressure sensor and hence, the present invention can acquire an advantageous effect that it is possible to provide a more highly reliable device while realizing the reduction of cost of the device.

Further, no particular operation condition of a vehicle is necessary in performing the diagnosis and hence, the diagnosis can be smoothly performed without worsening drivability.

Since the abnormality of the pressure sensor can be detected using the electromagnetic injector, it is possible to apply the present invention to the fuel injection device which is required to perform the detection of the abnormality of the pressure sensor using the electromagnetic injector while simplifying the constitution.

What is claimed is:

1. A pressure sensor diagnosis method in a common-rail-type fuel injection control device which is configured such that fuel in a fuel tank is pressurized and is supplied under pressure to a common rail by a high-pressure pump, a high-pressure fuel is injected into an internal combustion engine by way of an injector connected to the common rail, and a pressure of the common rail is controllable based on a detection signal of a pressure sensor which detects a pressure of the common rail, wherein a time from a point of time that energizing of the injector is finished to a point of time that a peak of a counter electromotive current generated in the injector is generated after the finishing of the energizing is measured as a valve closing time, a rail pressure with respect to the measured valve closing time is obtained as an estimated rail pressure based on a correlation acquired in advance between a valve closing time and the rail pressure, the estimated rail pressure and an actual rail pressure acquired by the pressure sensor are compared to each other, and the presence or the non-presence of an abnormality of the pressure sensor is determined based on a comparison result.

2. The pressure sensor diagnosis method according to claim 1, wherein when an absolute value of the difference between the estimated rail pressure and the actual rail pressure exceeds a predetermined error, it is determined that the pressure sensor has an abnormality.

3. A common-rail-type fuel injection control device which is configured such that fuel in a fuel tank is pressurized and is supplied under pressure to a common rail by a high-pressure pump, a high-pressure fuel is injected into an internal combustion engine by way of an injector connected to the common rail, and a pressure of the common rail is controllable by an electronic control unit based on a detection signal of a pressure sensor which detects a pressure of the common rail, wherein the electronic control unit is configured such that a time from a point of time that energizing of the injector is finished to a point of time that a peak of a counter electromotive current generated in the injector is generated after the finishing of the energizing is measured as a valve closing time, a rail pressure with respect to the measured valve closing time is obtained as an estimated rail pressure based on a correlation acquired in advance between a valve closing time and the rail pressure, the estimated rail pressure and an actual rail pressure acquired by the pressure sensor are compared to each other, and the presence or the non-presence of an abnormality of the pressure sensor is determined based on a comparison result.

4. The common-rail-type fuel injection control device according to claim 3, wherein the electronic control unit is configured to determine that the pressure sensor has an abnormality when an absolute value of the difference between the estimated rail pressure and the actual rail pressure exceeds a predetermined error.

* * * * *